P. RISSMANN.
PANEL TRIMMING MACHINE.
APPLICATION FILED JUNE 16, 1921.

1,431,899.

Patented Oct. 10, 1922.
6 SHEETS—SHEET 1.

INVENTOR.
Paul Rissman.
BY Stuart C Barnes
ATTORNEY.

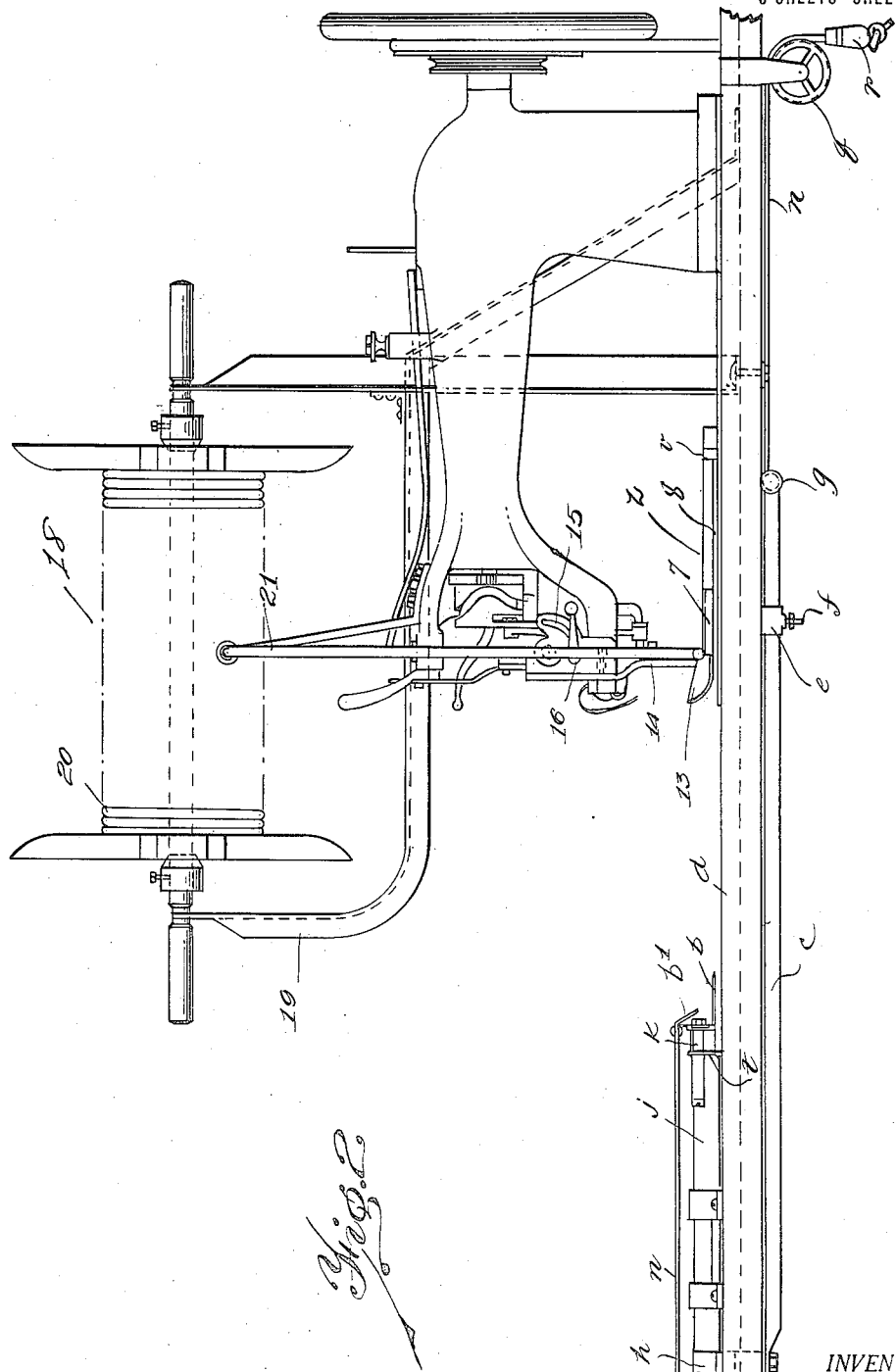

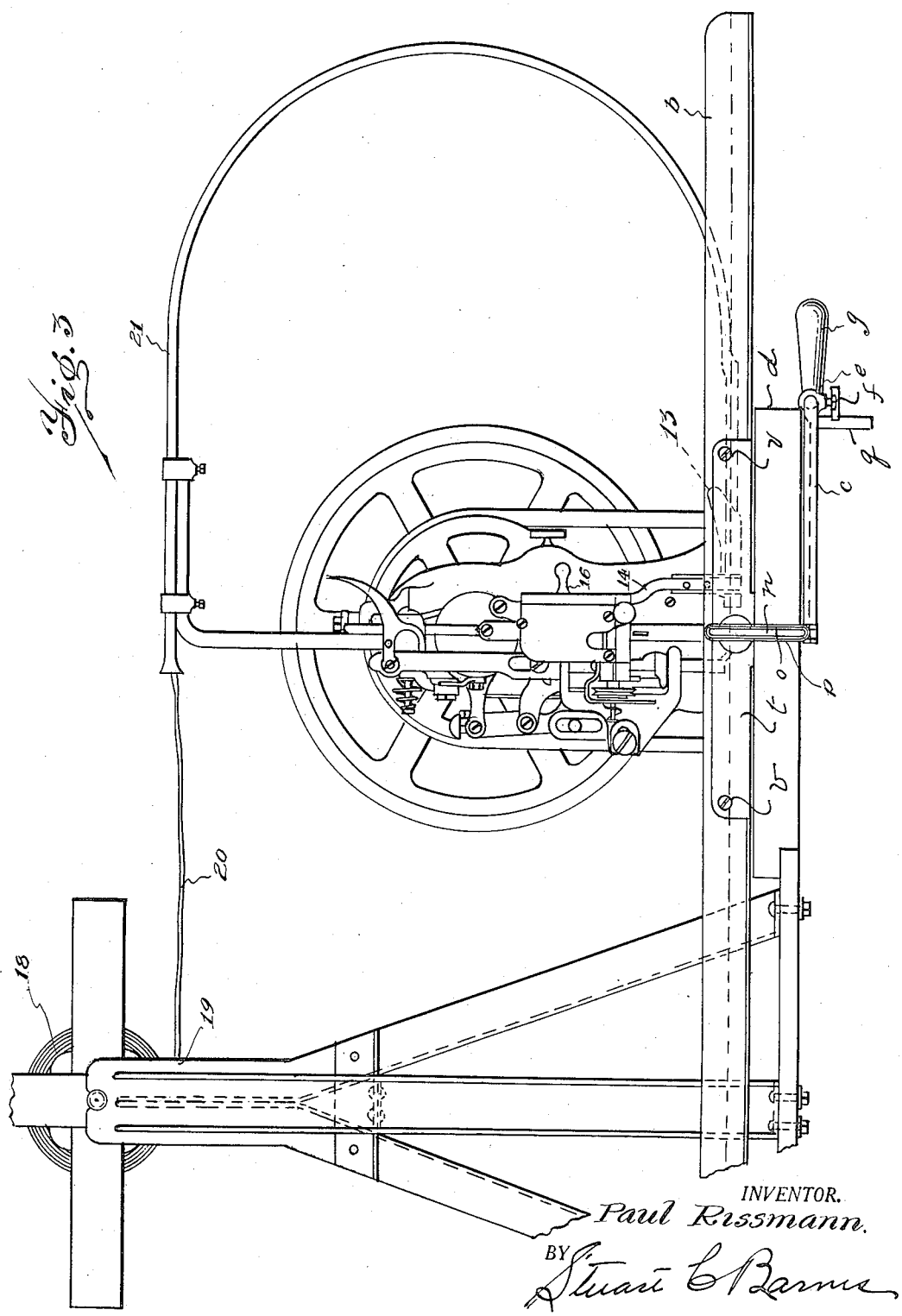

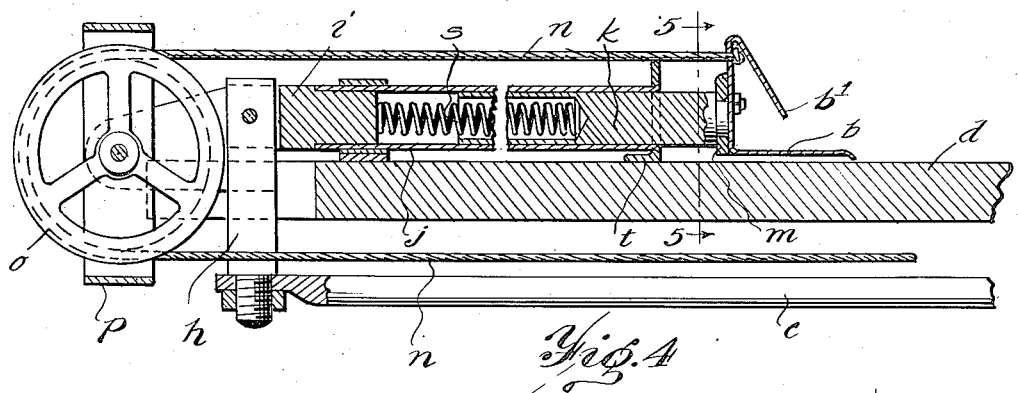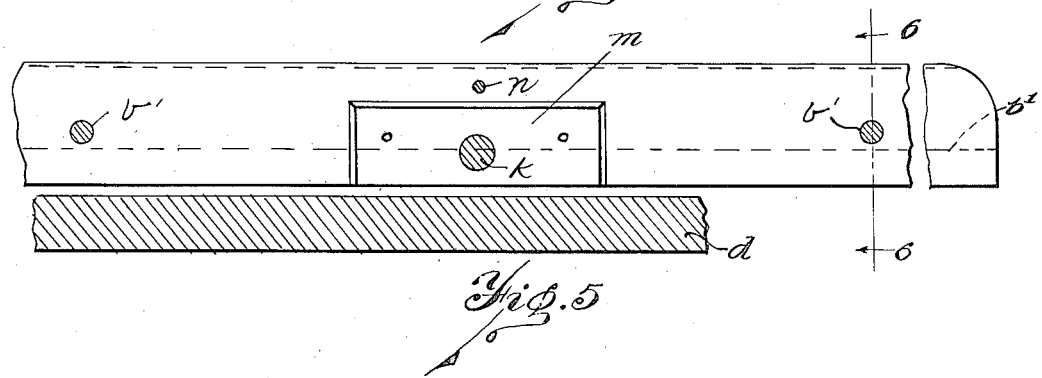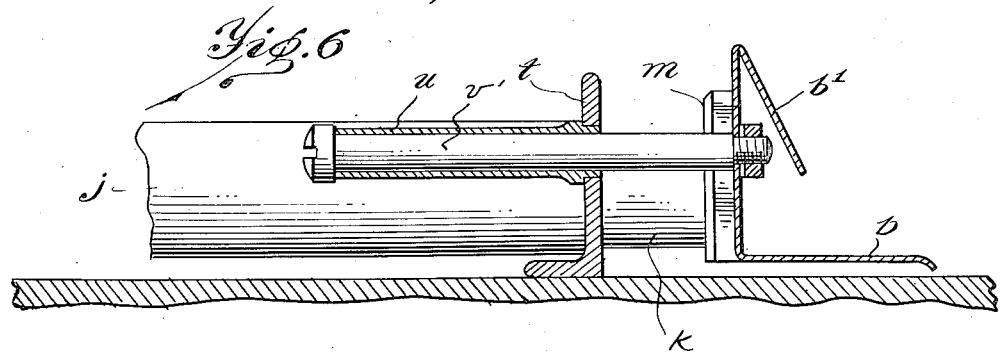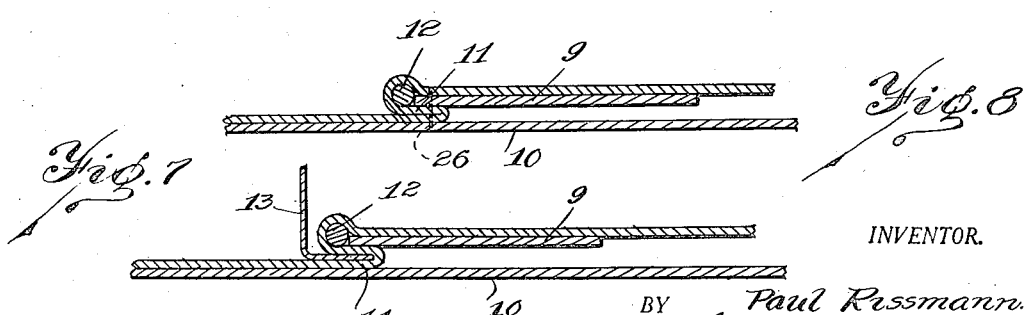

P. RISSMANN.
PANEL TRIMMING MACHINE.
APPLICATION FILED JUNE 16, 1921.
1,431,899.
Patented Oct. 10, 1922.
6 SHEETS—SHEET 5.
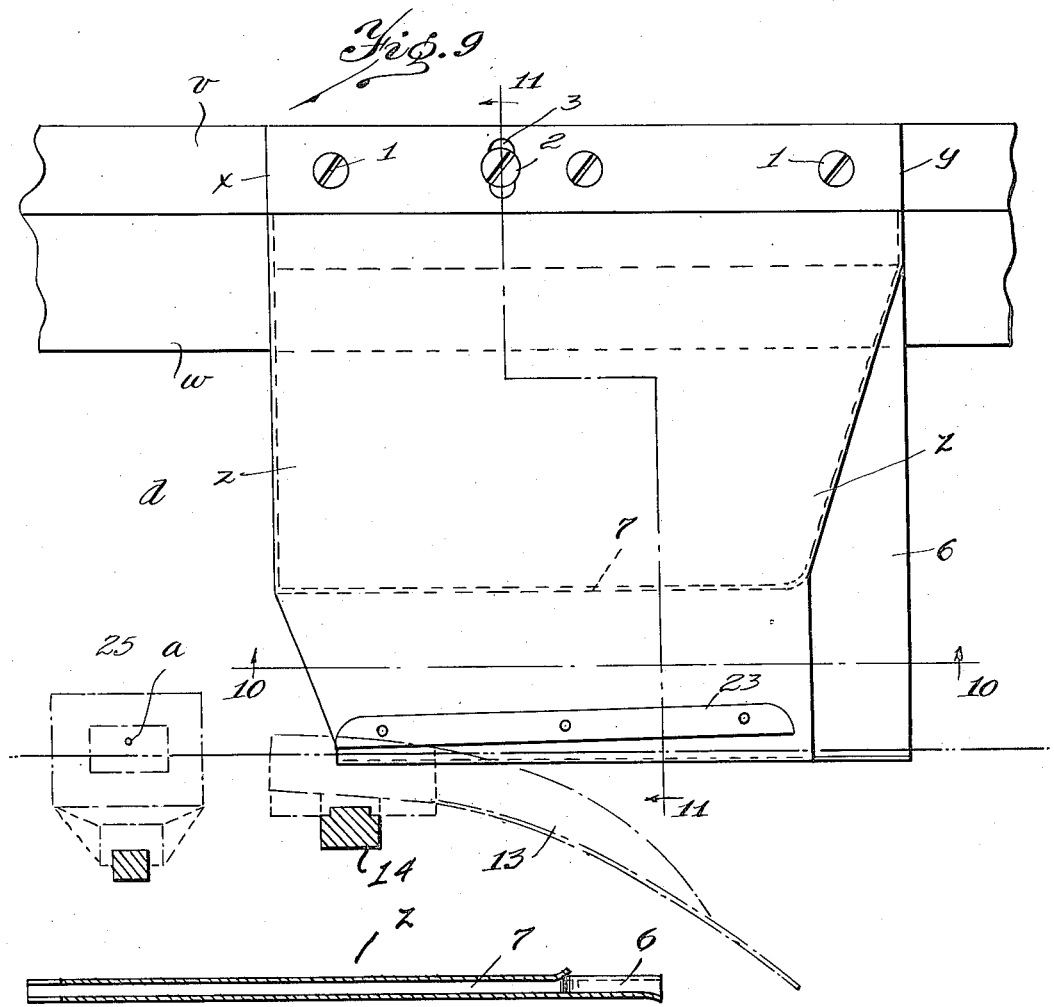
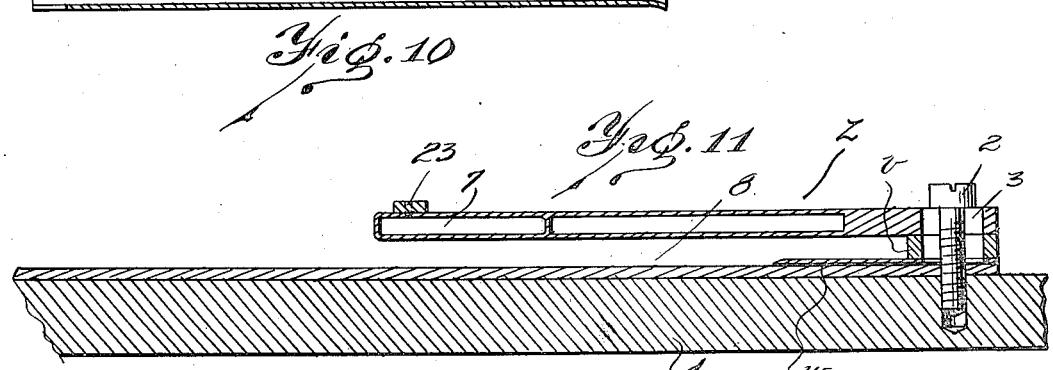
INVENTOR.
Paul Rissmann
BY
Stuart C Barnes
ATTORNEY.

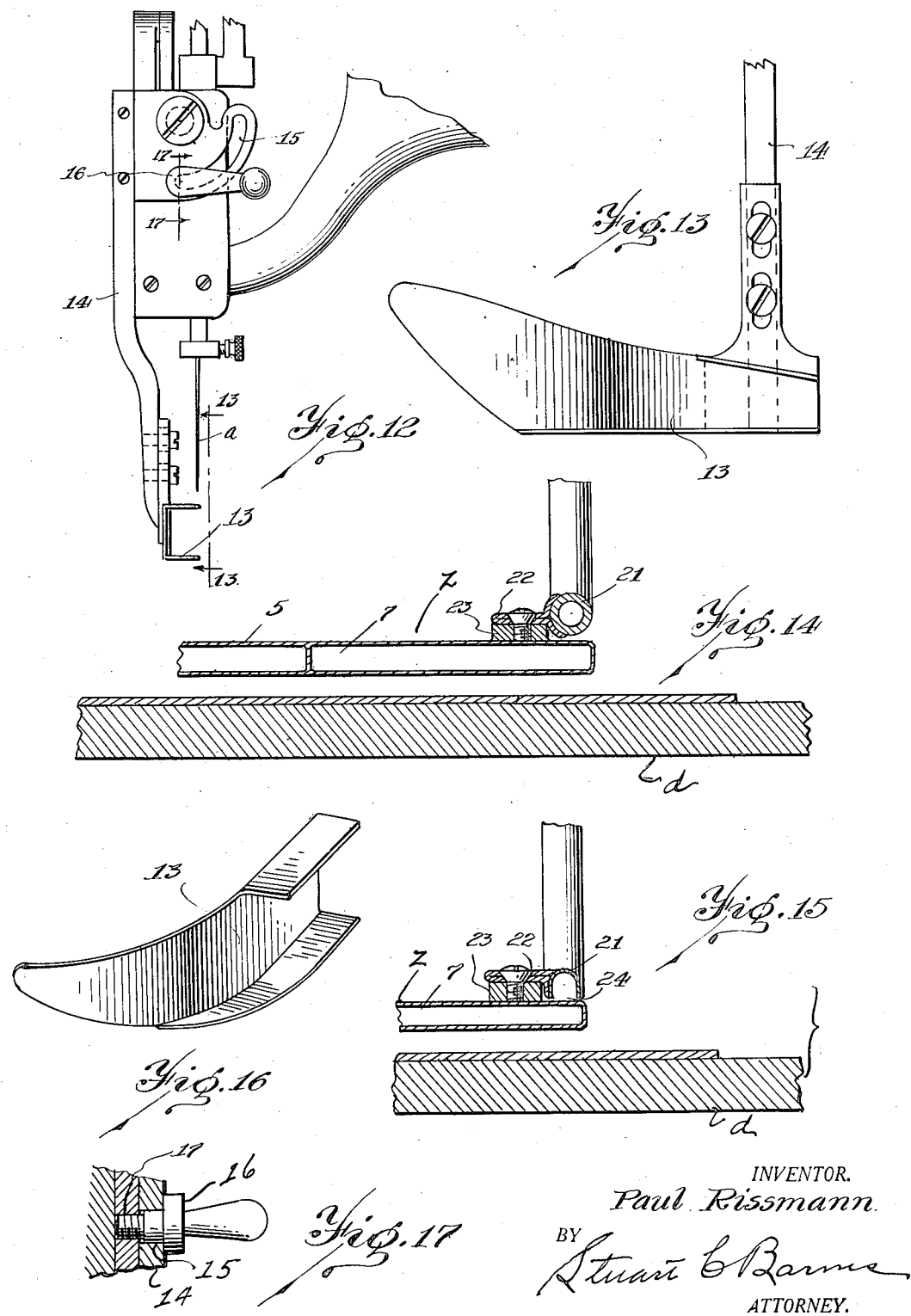

Patented Oct. 10, 1922.

1,431,899

UNITED STATES PATENT OFFICE.

PAUL RISSMANN, OF DETROIT, MICHIGAN, ASSIGNOR TO FISHER BODY CORPORATION, OF DETROIT, MICHIGAN, A CORPORATION OF NEW YORK.

PANEL-TRIMMING MACHINE.

Application filed June 16, 1921. Serial No. 478,024.

*To all whom it may concern:*

Be it known that I, PAUL RISSMANN, a citizen of the United States, residing at Detroit, in the county of Wayne and State of Michigan, have invented certain new and useful Improvements in Panel-Trimming Machines, of which the following is a specification.

This invention relates to machines for forming and stitching a bead in panel trimming. It is customary in modern automobile closed body trimming to provide a bead about a quarter or a third of the way down the panel trimming, which bead runs across from side to side. This is simply an ornamental device that enhances the beauty of the trimming. Not only is the bead formed but the panel trimming above the bead is of greater thickness above the bead than below. The ornamental trimming has heretofore, so far as I am aware, been largely done by hand, that is to say, the operator has had to carefully do all the stitching, fixing and guiding on an ordinary sewing machine. Production has, therefore, been rather slow and the trimming quite irregular. It is the object of the present invention to provide a suitable attachment to a sewing machine which will permit this work to be done very rapidly and with very much greater precision.

In the drawings,—

Fig. 2 is a front elevation of the sewing machine and attachment.

Fig. 3 is an end elevation of the sewing machine and the attachment.

Fig. 4 is a section taken on the line 4—4 of Fig. 1.

Fig. 5 is a section taken on the line 5—5 of Fig. 4.

Fig. 6 is a section taken on the line 6—6 of Fig. 5.

Fig. 7 is an enlarged fragmentary section of the work showing how the guide shoe forces the trimming material under the bead cord.

Fig. 8 is an enlarged fragmentary section of the finished work.

Fig. 9 is an enlarged plan view of the guiding attachment showing the relation of the sewing machine head and the guide shoe thereto.

Fig. 10 is a section on the line 10—10 of Fig. 9.

Fig. 11 is a section on the line 11—11 of Fig. 9.

Fig. 12 is a front elevation of the sewing machine head showing the guide shoe.

Fig. 13 is a view taken on the line 13—13 of Fig. 12.

Fig. 14 is a fragmentary section of the paper-board guide showing the cord guide attached. This is a section taken near the line 11—11 of Fig. 9.

Fig. 15 is a similar section taken a little further along toward the end of the cord and paper-board guides.

Fig. 16 is a perspective of the guide shoe.

Fig. 17 is a section on the line 17—17 of Fig. 12.

Figure 1:
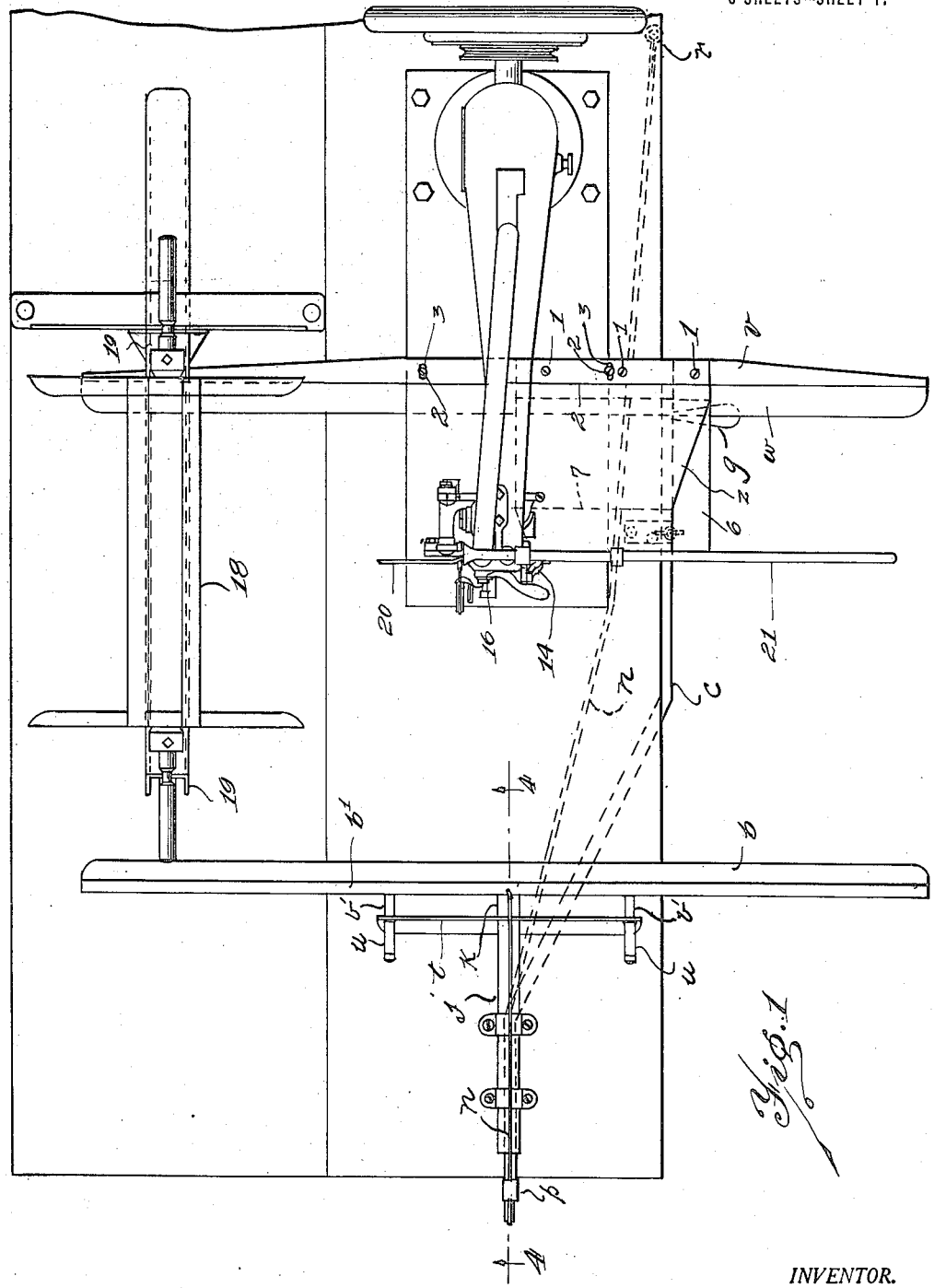
Fig. 1 is a plan view of the sewing machine and the attachment.

Referring to Fig. 3 and also Fig. 2, the outline of a sewing machine head will be apparent with the various devices that go to make up the same. It will not be necessary to describe these in detail as any well-known sewing machine head can be used. In Fig. 12 the needle $a$ will be apparent. This is the ordinary sewing machine with a vertically reciprocating needle. On the bed of the sewing machine is located a fiber board guide, which will perhaps be best understood from examining Figs. 9, 10 and 11 in connection with the plan view shown in Fig. 1. Referring to Fig. 1, it will be seen that there is on the left hand side of the machine a guide $b$. Now referring to Figs. 4 and 6, it will be seen that this guide $b$ comprises a perpendicularly-folded strip having its top edge turned over in V-like form in cross section. This is a guide for the lower end of the paper-board panel that forms the base of the panel trimming of the automobile body door and side quarters. The lower edge of this paper-board panel abuts against the vertical web of this guide while the turned-over flange $b^1$ at the top holds the paper-board panel from rising up out of the guide. This lower edge guide $b$ has a peculiar construction that makes it both adjustable and releasable from the paper board panel. *c* designates a rod that runs under the bed *d* of the machine (see Fig. 4—also Fig. 2). This rod runs through a bracket sleeve *e* provided with a set screw *f* and is provided with a handle *g*. The outer end of the rod is connected by means of an upstanding pin *h* (Fig. 4) with a yoke *i* that fits tightly into the spring barrel *j*. A plunger *k* is guided in said barrel and has its end riveted to a plate *m* that is secured to the sheet metal lower edge guide *b*. Obviously by moving the rod *c* through the bracket sleeve *e* and setting it with the screw *f* the normal position of the guide *b* may be varied to suit the panel boards of varying length, as this moves the slide toward and from the machine head.

The lower edge guide *b* is also quickly releasable by means of the cord *n* that passes over the pulley wheel *o* held in the bracket *p* and to the right hand side of the machine and over the pulley wheel *q* (Fig. 2). A handle *r* is within convenient reach of the operator so that at any time by a simple jerk down on the handle *r* the panel board lower edge guide *b* may be released to insert a new board, or for any other purpose. The spring *s* in the spring barrel *j* quickly returns the guide so that it resumes its normal position. The angle iron slide *t* (Fig. 6) is provided on the bed of the machine and provided with rearwardly-projecting barrels *u* which in connection with the headed studs *v'* bolted to the guide *b* form abutments to limit the outward movement of the guide under the spring projection. This slide *t* is slidable upon the bed and riveted to the spring barrel *j*, as is clearly shown in Fig. 4. This mechanism forms a panel board lower edge guide, making it both adjustable and quickly releasable.

Now as to the upper edge guide of the panel board, referring to Fig. 2, it will be seen that an abutment *v* is provided for the upper edge of the main or large panel board to rest against. Now referring to Figs. 9, 10 and 11, the nature of this will be better understood. *w* represents a smooth strip of metal laid on the bed *d* of the sewing machine. Sweated onto this is the abutment strip *v*. This abutment strip is cut away at *x* and *y* (Fig. 9) to receive the smaller paper board guide *z* which is secured thereto by means of the screws 1. The screws 2 run through the slots 3 into the bed of the machine *d*, hence both the large panel board edge guide and the smaller panel board guide are adjustable bodily within small limits upon the bed of the machine (see plan view, Fig. 1). Referring to Fig. 9, it will be seen just how the smaller panel board is guided. The guide *z* is provided with a bottom that is uncovered at 6 to receive the small paper board which may be rested on this uncovered portion and then slid into the guide pocket 7 which is open at both ends but closed at the sides, as will be evident from comparing Figs. 9, 10 and 11. This guide pocket is supported by the remainder of the smaller panel board guide above the space 8 which is occupied by the larger panel board when the two panel boards are fed through the machine. Hence this smaller panel board guide acts as a guide and also a locater of the smaller panel board with respect to the larger panel board.

Now turning to Figs. 7 and 8, one may comprehend just the character of work that is intended to be done. 9 designates the smaller panel board which is simply a heavy fiber board. 10 designates a fragment of the larger panel board which it will be understood is co-extensive with the inside surface of the door under the window and extends on the machine from the panel door lower edge guide *b* to the panel door upper edge guide *v*. It is the purpose of the machine to turn a tuck or fold 11 of the trimming material under the lower edge of the smaller panel board 9 and coincidentally feed a cord 12 in under the trimming material above the tuck and at the lower end of the smaller panel board 9. A shoe 13 serves to turn the tuck or fold in under the panel board 9. This shoe is located with respect to the smaller panel guide as shown in Fig 9. First, however, it must be explained how the work is fed to the machine. The larger panel board 10 has already been cut out, the trimming material, usually of velour or velvet, has been cut and clamped to the panel board by spring clamps (not shown). This work is ordinarily done by some one other than the operator of the machine. The work is brought in piles of these larger boards with the trimming clamped thereto. The machine operator takes one of the boards with the trimming material clamped thereto, removes the clamps and lays the panel board between the two panel board edge guides and the trimming over the small panel board guide, while the large panel board is under this guide. He then takes one of the smaller panel boards and feeds it through the pocket 7 of the smaller panel board guide *z*. He then swings the shoe 13 down against the forward edge of the material as the same is being fed to the needle. The shoe may be locked in this position as the shoe arm 14 is provided with a segmental slot 15 (Fig. 12) that swings over the screw-threaded stud 17 of the crank 16 (see Fig. 17). All one has to do is to turn the crank part of a turn and this releases the shoe arm 14 or clamps it tightly in place, depending upon the direction of the turn. This shoe 13 goes in under the smaller paper board guide *z*, as is shown in Fig. 9, and carries the trimming material with it in the form of a tuck or fold 11, as is shown in Fig. 7. The end of the shoe extends out beyond the smaller panel board guide z toward the needle and hence guides the trimming material and the tuck and fold to the needle while the tuck is still located under the smaller panel board, as will be evident from Fig. 9.

We have not, however, explained how the cord is fed to the rest of the work. Referring to the plan view, Fig. 1, it will be seen that there is a spool 18 supported upon a pair of uprights 19. Upon this spool is wound the cord 20 which passes through the loop-like pipe or cord guide 21 (see Fig. 3). The guide 21 serves to completely reverse the direction of movement of the cord, as will be evident from Fig. 3. The lower end of this loop-like cord guide 21 has a clip 22 soldered to it (Fig. 14) and this is screwed to the seat 23, which is a strip that is sweated onto the top of the smaller panel guide z. The bottom of this guide 21 opens near its end, as shown at 24, Fig. 15, and lets the cord run directly onto the smaller panel. The trimming, of course, has been passed over the lower portion of the cord guide 21.

The work, in substantially the condition shown in Fig. 7, is fed to the sewing machine head 25, where the needle a penetrates through the trimming, the smaller paper board panel, the tuck 11, and the larger panel board 10, forming the stitch 26 shown in Fig. 8. This completes the formation of the ornamental bead and the thickened portion of the trimming on the panel.

It will be seen that the member z has a small pocket 7 and a large pocket adjoining this small pocket. The large pocket has no mechanical function. It is simply to make the member lighter.

What I claim is:

1. The combination with sewing mechanism, of means for guiding a piece of trimming material thereto, means for guiding a cord under the trimming material, and a shoe that may be swung down upon the work for forming a tuck in the trimming material under the cord, the said sewing mechanism serving to stitch the cord in and the tuck and the main portion of the trimming material and tuck together.

2. In a machine for the purpose specified, the combination of sewing mechanism, means for guiding a panel board with trimming material thereto, means for guiding a cord to the stitching mechanism, and means for forming a tuck in the trimming material under the cord, said tuck being presented to the sewing mechanism which stitches the trimming material, the tuck and the panel board together and thereby encloses the cord in the trimming material to form an ornamental bead.

3. In a machine for the purpose specified, the combination of sewing mechanism, means for guiding a large panel board thereto together with trimming material, means for guiding a smaller panel board above the larger panel board to the sewing mechanism, means for guiding a cord to the stitching mechanism at the lower edge of the smaller panel board, and means for forming a tuck in the trimming material under the cord and under the lower edge of the smaller panel board, the said trimming material, cord and panel boards being guided to the stitching mechanism which stitches the trimming material, the tuck and two panel boards together.

4. In a machine for the purpose specified, the combination of sewing mechanism, a guide for guiding a panel board covered with trimming material, and means for forming a tuck in the trimming material over the panel board, the said panel board, the tuck and trimming material being guided to the sewing mechanism which stitches the tuck and panel board together.

5. In a machine for the purpose specified, the combination of sewing mechanism, means for guiding a large panel board thereto with trimming material thereon, means for guiding a small panel board above the large panel board to the sewing mechanism, and means for forming a tuck in the trimming material, the said tuck, trimming material and the two panel boards being guided to the sewing mechanism which stitches the trimming material including the tuck and the two panel boards together.

6. In a machine for the purpose specified, the combination of sewing mechanism, a panel board guide consisting of a strip for engaging the one edge of the panel board and an abutment for engaging the other edge of the panel board, a small panel board guide in the form of an overhanging member provided with a pocket closed at the sides and open at the ends, and means for tucking the trimming material that lies over the small panel board guide in under the lower edge of the small panel board guide as the two panel boards are fed to the sewing mechanism which unites the trimming material including the tuck and the two panel boards together.

7. In a machine for the purpose specified, the combination of sewing mechanism, a large panel board guide, means for guiding a small panel board above the large panel board to the sewing mechanism, and means for tucking the trimming material that lies over the small panel guide over the lower edge of such guide, said means comprising a shoe that can be swung in to form a fold of the trimming material under the small panel board and guide at the lower edge, said panel boards and trimming material including the tuck being guided to the sewing mechanism which stitches them together.

8. In a machine for the purpose specified, the combination of sewing mechanism, a large panel board guide, a small panel board guide for supporting a small panel board over the large panel board and comprising a member provided with a pocket open at its two ends, a cord guide in the form of a pipe-like member having its lower end secured to the top of the small panel board guide, and means for tucking the trimming material that overlies the small panel board guide in under the lower edge thereof and under the cord as the parts are being fed to the stitching mechanism which unites the two panel boards and the trimming material including the tuck together.

9. In a machine for the purpose specified, the combination of sewing mechanism, a large panel board guide, a small panel board guide for supporting such panel board above the large panel board, means for feeding a cord to the panel boards and at the lower edge of the smaller panel board, comprising a pipe-like guide and means for tucking the trimming material that overlies the large panel board and the small panel board guide under the lower edge of the latter and under the cord, as the panel boards, trimming material and cord are fed to the sewing mechanism to be sewed together.

10. In a machine for the purpose specified, the combination of stitching mechanism, a large panel board guide including at one edge a quickly releasable guide member, a small panel board guide for guiding a small panel board above the large panel board to the stitching mechanism, and means for forming a tuck under the lower edge of the small panel board as the trimming material and the panel boards are guided to the sewing mechanism to be stitched together.

11. In a machine for the purpose specified, the combination of sewing mechanism and a panel board guide including a guiding strip for one edge of the panel board, a yoke member carrying a spring barrel and a slide on the end of the spring barrel, a plunger secured to said guiding strip and guided in said spring barrel and the spring for normally projecting said plunger, means for permanently shifting the yoke, spring barrel and slide for adjusting the position of the guiding strip, and means by which said guiding strip may be quickly withdrawn against the pressure of the spring when manipulating the panel board, said guide serving to guide the panel board equipped with trimming material to the sewing machine.

12. In a machine for the purpose specified, the combination of sewing mechanism and a large panel board guide including a guiding strip, a yoke, spring barrel and slide secured together, a plunger guided in the spring barrel and attached to the guide strip, a spring in the barrel for projecting the plunger and the guide strip, means for stopping the projecting of the said guide strip, means for shifting the yoke, spring barrel and slide to secure a permanent adjustment of the guide strip, and means by which said guide strip may be drawn in against the pressure of the spring, said panel board guide serving to guide a panel board with trimming material to the sewing mechanism.

13. In a machine for the purpose specified, the combination of sewing mechanism and a large panel board guide comprising a guide strip, a yoke, a spring barrel, a slide to which the three last are secured together, barrels $u$ secured to the slide, a plunger secured to the guide strip and guided in said spring barrel, a spring provided therein for projecting the plunger outward, and the said guide strip having studs provided with headed ends and guided in said barrels $u$, means for shifting said yoke for securing a permanent adjustment of the guide strip, and means by which said guide strip may be drawn in against the pressure of the spring, the said panel board guide serving to guide a panel board with trimming material to the sewing mechanism.

In testimony whereof I affix my signature.

PAUL RISSMAN